US 8,910,952 B2

(12) United States Patent
Yoo et al.

(10) Patent No.: US 8,910,952 B2
(45) Date of Patent: Dec. 16, 2014

(54) ACTIVE GEOMETRY CONTROL SUSPENSION SYSTEM OF VEHICLE

(71) Applicant: Hyundai Motor Company, Seoul (KR)

(72) Inventors: Sang Hoon Yoo, Asan-si (KR); In Seok Seo, Seoul (KR); Sung Bae Jang, Suwon-si (KR); Byung Gu Kang, Seoul (KR); Un Koo Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/098,503

(22) Filed: Dec. 5, 2013

(65) Prior Publication Data

US 2014/0300067 A1    Oct. 9, 2014

(30) Foreign Application Priority Data

Apr. 3, 2013  (KR) ........................ 10-2013-0036500

(51) Int. Cl.
*B60G 7/00*        (2006.01)
*B60G 17/00*       (2006.01)
*B60G 17/016*      (2006.01)

(52) U.S. Cl.
CPC .............. *B60G 17/00* (2013.01); *B60G 17/016* (2013.01); *B60G 7/006* (2013.01)
USPC ................. 280/5.522; 280/5.52; 280/86.75

(58) Field of Classification Search
CPC ............. B60G 7/006; B60G 2200/462; B60G 17/015; B60G 17/016; B60G 17/0162; B62D 17/00
USPC .......... 280/5.522, 5.52, 5.521, 86.75, 86.751, 280/86.753
See application file for complete search history.

(56) References Cited

U.S. PATENT DOCUMENTS 5,700,025 A *  12/1997  Lee ........................... 280/86.751
7,370,552 B2 *  5/2008  Yun ............................. 74/484 R
(Continued)

FOREIGN PATENT DOCUMENTS

KR    10-2010-0048158 A    5/2010
KR    10-2011-0108777 A    10/2011
(Continued)

OTHER PUBLICATIONS

Jang et al., Active Geometry Control Suspension System, Jun. 19, 2012, Korean Patent Office, KR 10-2012-0064539 A, Machine Translation of Description.*
Kim, Active Geometry Control Suspension System, Apr. 5, 2012, Korean Patent Office, KR 10-2012-0032340 A, Machine Translation of Description.*

* cited by examiner

*Primary Examiner* — James English
(74) *Attorney, Agent, or Firm* — Morgan, Lewis & Bockius LLP

(57) ABSTRACT

An active geometry control suspension system may include a toe control mechanism having an assist link disposed between the wheel carrier and the sub-frame, a housing unit integrally formed with the sub-frame and having hinge brackets integrally formed at both sides of a wheel side one surface, a guide unit configured to guide a vehicle body side connection portion of the assist link along a predetermined trajectory through a cam guider which slides upward and downward along guide, a drive unit configured to transmit rotating driving torque, and a power transmission unit configured to transmit the linear motion to the vehicle body side connection portion of the assist link so that the vehicle body side connection portion of the assist link is raised and lowered along a predetermined trajectory of the guide unit by the rotating driving torque of the screw shaft.

7 Claims, 8 Drawing Sheets

(56) References Cited

U.S. PATENT DOCUMENTS

| | | | |
|---|---|---|---|
| 8,302,973 B2* | 11/2012 | Lee et al. | 280/5.52 |
| 8,579,313 B2* | 11/2013 | Lee et al. | 280/124.152 |
| 8,608,186 B2* | 12/2013 | Lee et al. | 280/124.106 |
| 2011/0233880 A1* | 9/2011 | Lee | 280/5.5 |
| 2012/0049480 A1* | 3/2012 | Lee et al. | 280/124.106 |
| 2013/0147134 A1* | 6/2013 | Lee et al. | 280/5.52 |
| 2014/0132007 A1* | 5/2014 | Yoo et al. | 290/1 C |

FOREIGN PATENT DOCUMENTS

| | | |
|---|---|---|
| KR | 1020120032340 A | 4/2012 |
| KR | 10-2012-0064539 A | 6/2012 |
| KR | 1020130012293 A | 2/2013 |

ACTIVE GEOMETRY CONTROL SUSPENSION SYSTEM OF VEHICLE

CROSS-REFERENCE TO RELATED APPLICATION

The present application claims priority to Korean Patent Application No. 10-2013-0036500 filed on Apr. 3, 2013, the entire contents of which is incorporated herein for all purposes by this reference.

BACKGROUND OF THE INVENTION

1. Field of the Invention

The present invention relates to an active geometry control suspension system of a vehicle, and more particularly, to an active geometry control suspension system of a vehicle capable of increasing turning stability by moving downward a vehicle body side connection point of an assist link when the vehicle is rapidly turned such that a turning outer side rear wheel is induced to toe-in.

2. Description of Related Art

A suspension system in a vehicle is present between a vehicle body and a wheel, and serves to appropriately maintain balance of relative motion between the vehicle body and the wheel using one or a plurality of links.

The suspension system efficiently blocks an irregular input from a road surface, which occurs when the vehicle travels, so as to provide a comfortable ride comfort to passengers, and appropriately controls vibration of the vehicle body, which is generated by a driver's driving operation and unevenness of the road surface, so as to provide driving convenience to the driver. In addition, when the vehicle travels on an irregular road surface, a basic condition needs to be satisfied which secures controllability and stability of the vehicle, when the vehicle turns, brakes, and is driven, by maintaining at a predetermined level a vertical load on surfaces where a tire comes into contact with the road surface.

In order to satisfy the condition, a posture of a wheel by suspension geometry acts as a very important factor, and the posture of the wheel is greatly varied in accordance with relative motion with respect to the vehicle body, and the overall performance of the vehicle depends on the posture of the wheel.

Accordingly, recently, various suspension systems have been developed and the development has been repeated in order to satisfy the above condition, and particularly, recently, as preference regarding a consumer's "fun to drive" has rapidly increased in addition to an appearance of a high power engine, the development of a high performance suspension system, which may delightfully express the intention of the driver, is strongly required.

An active geometry control suspension system has been developed to meet the above demand.

The active geometry control suspension system changes geometry of a rear wheel suspension system when the vehicle turns at a high speed so as to improve grip force of the rear wheel and handling performance, and is configured by adding a toe control mechanism into a multiple link type of rear wheel suspension system.

Further, when the vehicle rapidly turns, the toe control mechanism moves downward a vehicle body side connection point of the assist link so that a turning outer rear wheel is induced to toe-in, thereby increasing turning stability.

The active geometry control suspension system detects a travelling status of the vehicle, and drives an actuator by engineering logic loaded on an electronic control unit (ECU), and the vehicle body side connection point of the assist link is moved in accordance with an operation of the actuator so as to increasing a bump toe of the turning outer rear wheel so that a stable turning operation is performed.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an active geometry control suspension system in which a rotating shaft of an actuator and a screw shaft, which are applied to a toe control mechanism, are separately formed, and connected to each other by a coupler such that managing clearance between shafts, and squareness of shafts, development tuning, and an assembly, and after service may be easily performed.

An exemplary embodiment of the present invention provides an active geometry control suspension system of a vehicle, including a toe control mechanism which is configured between a wheel carrier and a sub-frame at a rear wheel side, and actively controls a posture of a vehicle body, in which the toe control mechanism may include an assist link disposed between the wheel carrier and the sub-frame, a housing unit integrally formed with the sub-frame and having hinge brackets integrally formed on both sides of a wheel side one surface, a guide unit configured to guide a vehicle body side connection portion of the assist link along a predetermined trajectory through a cam guider which slides upward and downward along guide rails disposed on both side surfaces of the housing unit, a drive unit configured to connect a rotating shaft of an actuator which is installed at one side of the housing unit and a screw shaft disposed at one side of an inner portion of the housing unit by a coupler, and transmit rotating driving torque, and a power transmission unit configured to convert the rotating driving torque of the screw shaft into linear motion and transmit the linear motion to the vehicle body side connection portion of the assist link so that the vehicle body side connection portion of the assist link is raised and lowered along a predetermined trajectory of the guide unit by the rotating driving torque of the screw shaft.

In addition, the guide unit may include guide rails having a guide hole having an arc-shaped trajectory formed in a central portion thereof and fixed on both side surfaces of the housing unit, a cam guider having a slot-shaped bolt hole formed in a central portion thereof and configured to come into rolling contact with each of the guide rails so as to be raised and lowered along each of the guide rail, and a cam bolt engaged with a cam nut by passing through the bolt hole of the cam guider, the guide hole of the guide rail, and the vehicle body side connection portion of the assist link, and configured to allow the vehicle body side connection portion of the assist link and the cam guider to integrally slide upward and downward along the trajectory of the guide hole.

In addition, the trajectory of the guide hole may be formed of an arc-shaped trajectory that may have a wheel side connection point of the assist link as a rotation center thereof In addition, the drive unit may include an actuator installed at one side of an upper portion of the housing unit and including a decelerator, a screw shaft configured to be separated from the rotating shaft of the actuator and disposed at one side of an inner portion of the housing unit, and a coupler configured to connect the rotating shaft of the actuator and the screw shaft.

In addition, the actuator may include a step motor that is capable of controlling a rotating direction and a rotation speed thereof.

In addition, the screw shaft may be installed on upper and lower support members by interposing thrust bearings to an upper end and a lower end of the screw shaft, respectively, and disposed in the housing unit by the upper and lower support members so as to be disposed on the same axis as the rotating shaft of the actuator.

In addition, the coupler may connect the rotating shaft of the actuator and the screw shaft so that power is able to be transmitted therethrough, in a state in which the coupler is seated on a coupler support member that is installed at one side of an upper portion of the housing unit.

In addition, the power transmission unit may include a slider having a screw hole formed in a vertical direction so as to be screw-coupled to the screw shaft of the drive unit, a pair of guide rods disposed at left and right sides and configured to pass through the slider upward and downward at both sides of the screw shaft such that an upper end and a lower end of the guide rod are fixed to the upper and lower support members, and to guide the slider without moving the slider, and a pair of lever arms disposed at left and right sides and disposed at both sides of the vehicle body side connection portion of the assist link such that a wheel side end portion thereof is hingedly connected to the hinge bracket by a hinge pin, and a vehicle body side end portion thereof is connected to both sides of the slider.

In addition, the slider and the lever arm may form fork pins on both side surfaces of the slider, and forks on the vehicle body side end portion of the lever arm such that the fork pins and the forks are connected to each other, and bushings are interposed between the fork pins and the forks.

In addition, the bushing may have a quadrangular shaped contact portion where the bushing comes into contact with the fork.

In addition, in the contact portion with the fork, an outer surface of the bushing may be formed to have a waveform.

The exemplary embodiment of the present invention moves downward the vehicle body side connection point of the assist link when the vehicle is rapidly turned such that the turning outer side rear wheel is induced to toe-in, thereby increasing turning stability.

Further, the rotating shaft of the actuator and the screw shaft are separately formed, and connected to each other by a coupler such that management of clearance between shafts, and squareness of shafts, development tuning, and an assembly and after service may be easily performed.

In addition, the bushing interposed between the fork pin of the slider and the fork of the lever arm is formed to be quadrangular such that an assembly may be performed regardless of direction, loads are distributed to improve abrasion resistance, and the fork contact portion of the bushing is formed to have a waveform, thereby minimizing friction between the lever arm and the fork.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
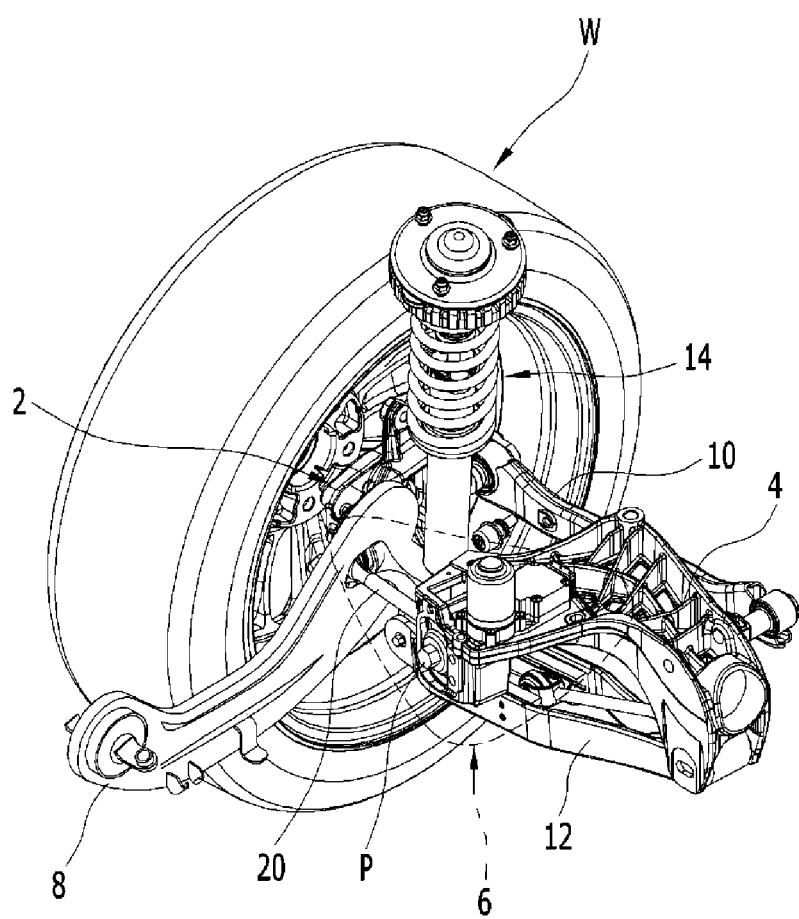
FIG. 1 is a perspective view of a general active geometry control suspension system.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

However, to clearly describe the exemplary embodiment of the present invention, parts that are irrelevant to the description are omitted. Like numerals refer to like or similar constituent elements throughout the specification.

In the following detailed description, names of constituents, which are in the same relationship, are divided into "the first", "the second", and the like, but the present invention is not limited to the order in the following description.

FIG. 1 is a perspective view of a general active geometry control suspension system.

Referring to FIG. 1, an active geometry control suspension system includes a toe control mechanism 6 disposed between a wheel carrier 2 configured to rotatably support a rear wheel W and a sub-frame 4.

The wheel carrier 2 includes a trailing arm 8 protruding forward, and is connected to upper and lower arms 10 and 12 that are disposed in a vehicle width direction between the wheel carrier 2 and the sub-frame 4, which is disposed at a vehicle body side, by a shock absorbing mechanism 14.

A vehicle body side end portion of the upper arm 10 is connected to the sub-frame 4, and a wheel side end portion of the upper arm 10 is connected to an upper side of the wheel carrier 2, by interposing horizontal type rubber bushings to both end portions of the upper arm 10.

A vehicle body side end portion of the lower arm 12 is connected to the sub-frame 4, and a wheel side end portion of the lower arm 12 is connected to a lower side of the wheel carrier 2, by interposing horizontal type rubber bushings to both end portions of the lower arm 12.

The shock absorbing mechanism 14 is disposed between the wheel carrier 2 or the wheel side end portion of the lower arm 12 and the vehicle body so as to perform a shock absorbing operation in an up and down direction of the wheel carrier 2.

The toe control mechanism 6 is disposed at a front side of the upper arm 10 so as to be spaced apart from the upper arm 10 in the vehicle width direction, and as necessary, controls a toe of the rear wheel W while pulling or pushing a front portion of the wheel carrier 2 toward a vehicle body side or a wheel side.

That is, the toe control mechanism 6 controls a toe while serving as a front upper arm together with the upper arm 10.

Figure 2:
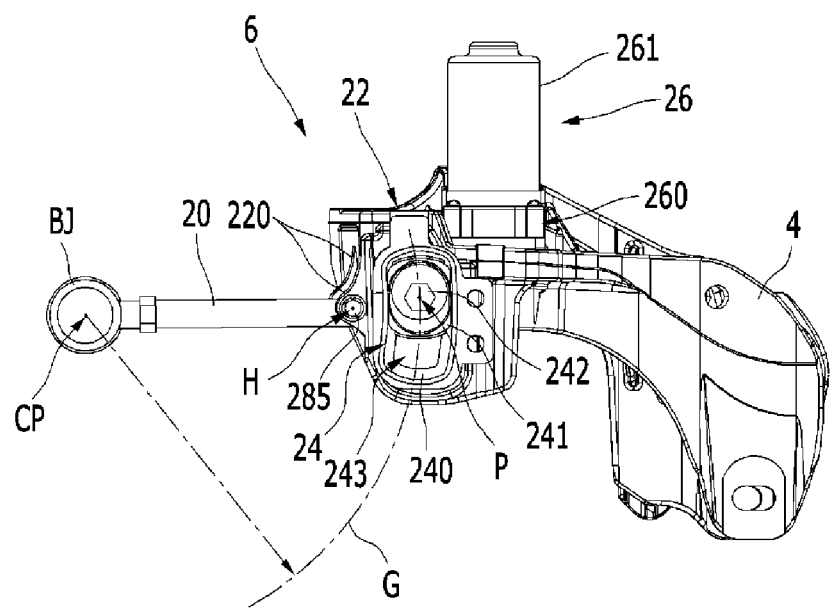
FIG. 2 is a side perspective view of a toe control mechanism of an active geometry control suspension system according to an exemplary embodiment of the present invention.
Figure 3:
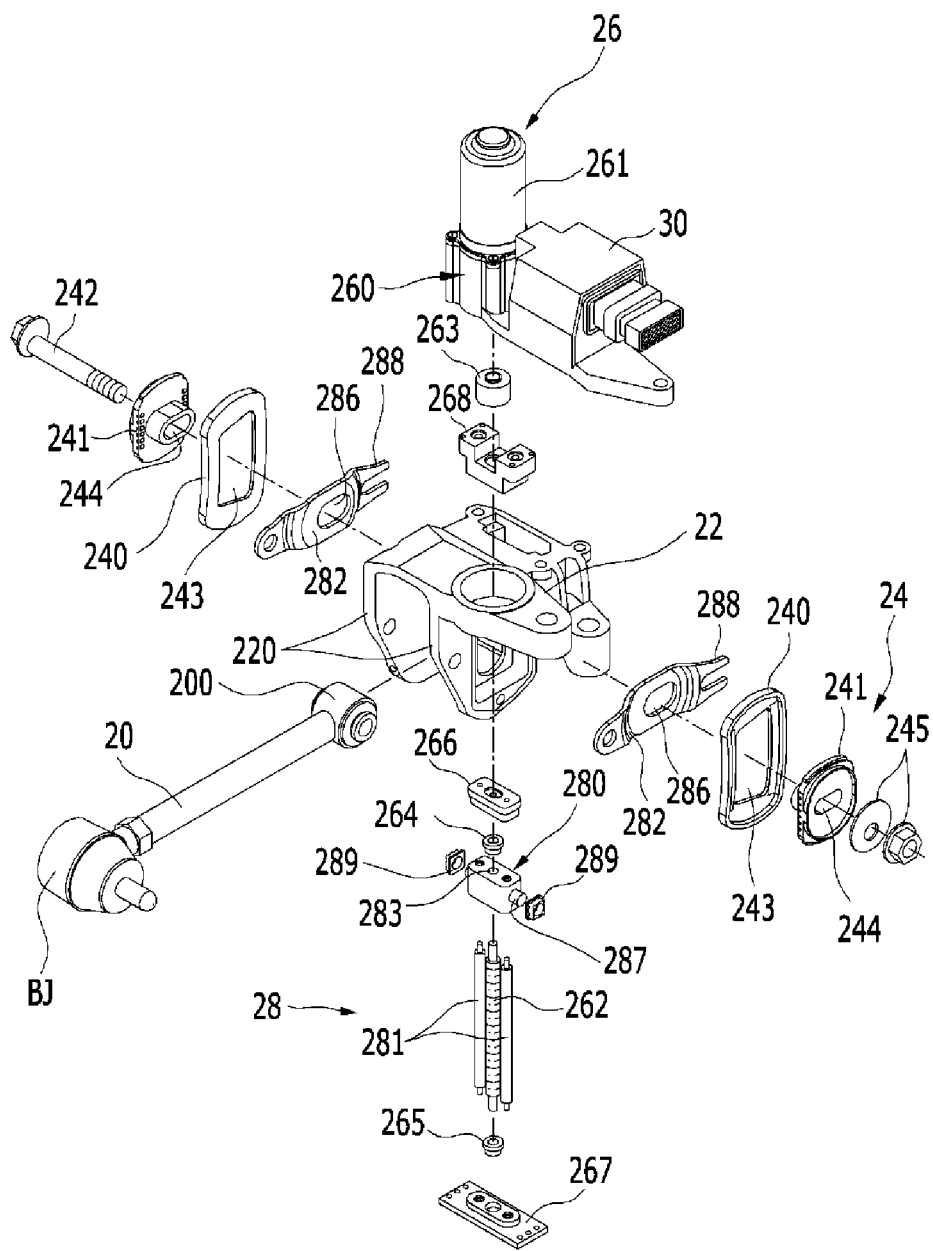
FIG. 3 is an exploded perspective view of the toe control mechanism of the active geometry control suspension system according to the exemplary embodiment of the present invention.
Figure 4:
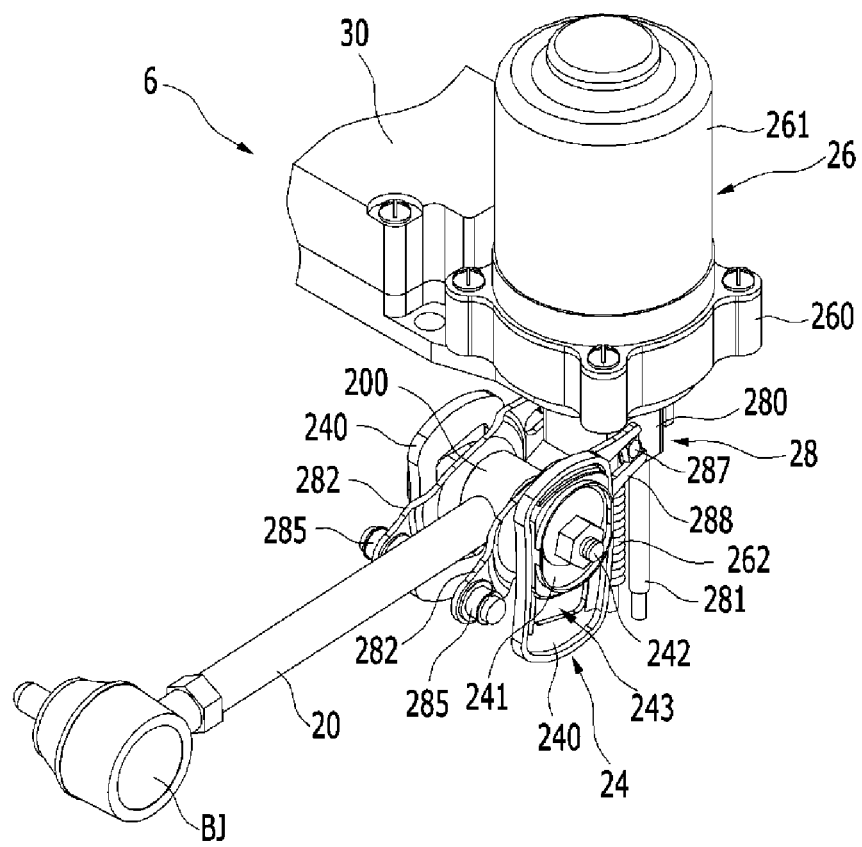
FIG. 4 is a front perspective view of the toe control mechanism of the active geometry control suspension system according to the exemplary embodiment of the present invention.
Figure 5:
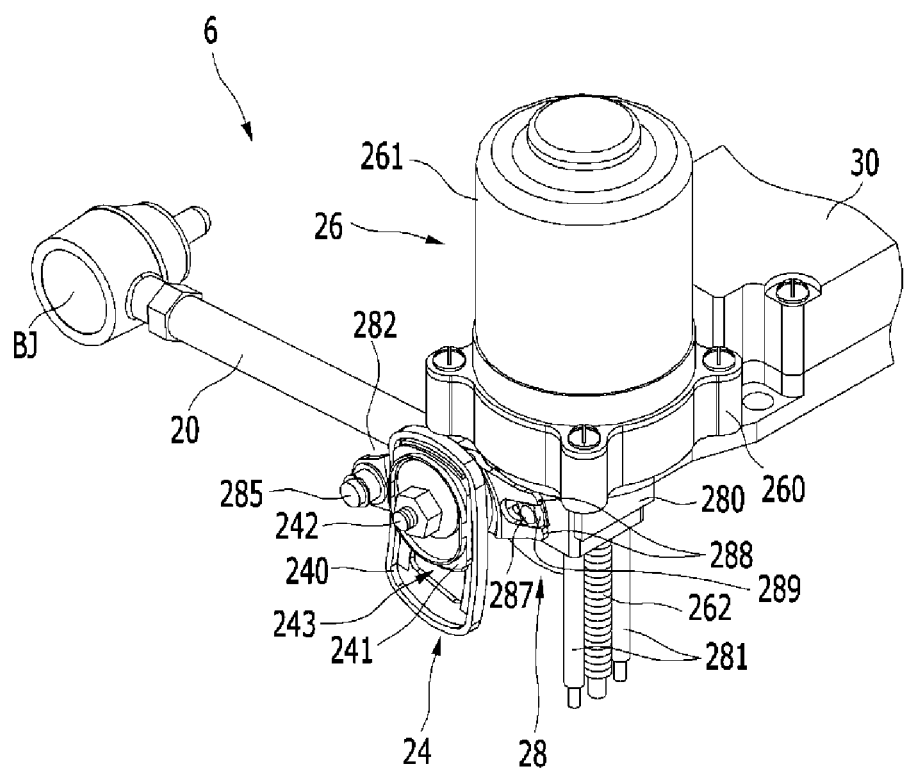
FIG. 5 is a perspective view of a rear interior of the toe control mechanism of the active geometry control suspension system according to the exemplary embodiment of the present invention.
Figure 6:
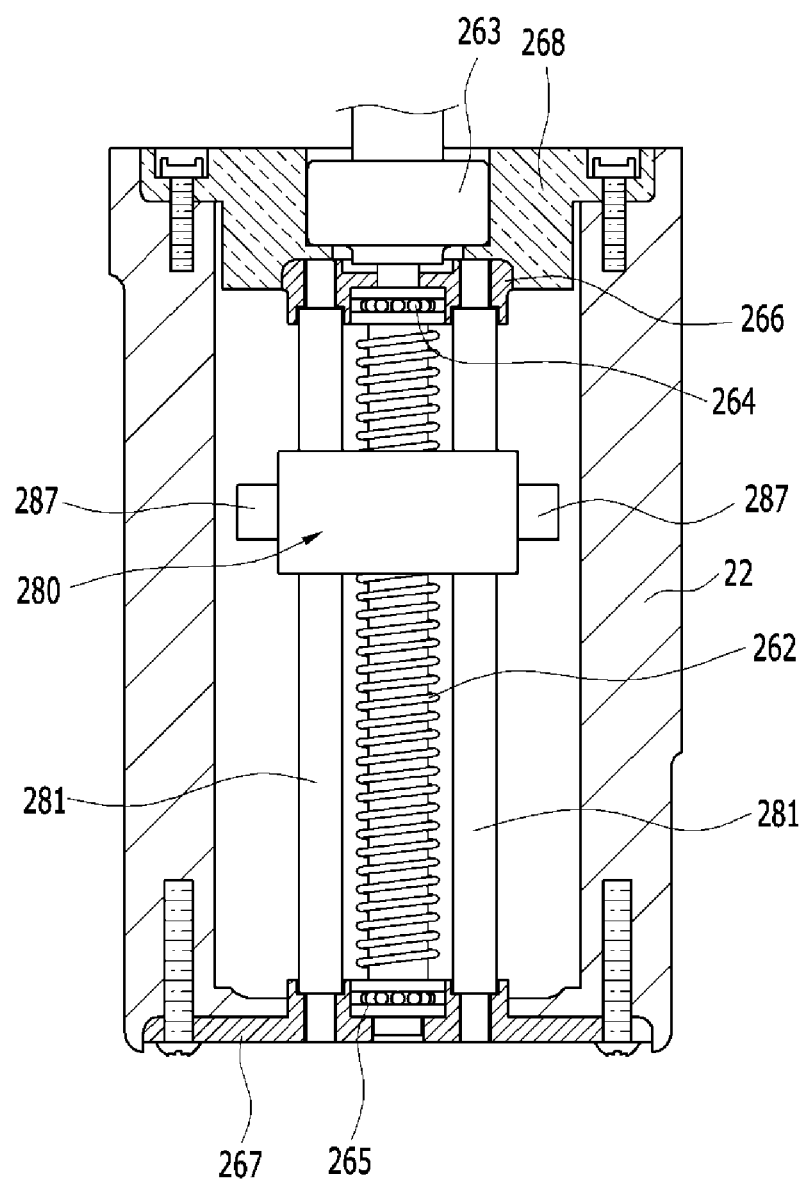
FIG. 6 is a partially assembled cross-sectional view of a drive unit and a power transmission unit that is applied to the toe control mechanism of the active geometry control suspension system according to the exemplary embodiment of the present invention.

FIG. 2 is a side perspective view of the toe control mechanism that is applied to the active geometry control suspension system according to the exemplary embodiment of the present invention, FIG. 3 is an exploded perspective view of the toe control mechanism that is applied to the active geometry control suspension system according to the exemplary embodiment of the present invention, FIGS. 4 and 5 are perspective views of a front side and a rear interior of the toe control mechanism that is applied to the active geometry control suspension system according to the exemplary embodiment of the present invention, and FIG. 6 is a partially assembled cross-sectional view of a drive unit and a power transmission unit that are applied to the toe control mechanism of the active geometry control suspension system according to the exemplary embodiment of the present invention.

Referring to FIGS. 2 and 4, the toe control mechanism 6, which is applied to the active geometry control suspension system according to the present exemplary embodiment, includes an assist link 20, a housing unit 22, a guide unit 24, a drive unit 26, and a power transmission unit 28.

Referring to FIGS. 3 to 6, the assist link 20 connects the wheel carrier 2 and the guide unit 24 to each other, a wheel side end portion of the assist link 20 is connected to the wheel carrier 2 through a ball joint BJ, and a vehicle body side connection portion 200 of the assist link 20 is connected to the guide unit 24 through the rubber bushing.

The housing unit 22 indicates a part of the sub-frame 4 or a separate member mounted on the sub-frame 4, and as illustrated in FIG. 2, includes a pair of hinge brackets 220 which protrudes toward the wheel side.

The pair of hinge brackets 220 is formed to have a sufficient interval therebetween so that the vehicle body side connection portion 200 of the assist link 20 is inserted therebetween.

The guide unit 24 includes guide rails 240, cam guiders 241, and a cam bolt 242.

The guide rail 240 has a guide hole 243 having a predetermined trajectory which is formed in a central portion thereof, and the guide rails 240 are integrally fixed to both side surfaces of the housing unit 22 by a welding method or the like, respectively.

As illustrated in FIG. 2, the aforementioned predetermined trajectory means an arc-shaped trajectory G that the vehicle body side connection portion 200 of the assist link 20 has a wheel carrier side connection point CP of the assist link 20 as a rotation center thereof The cam guider 241 is disposed so as to be able to slide upward and downward along the trajectory G of the guide rail 240, and guides the vehicle body side connection portion 200 of the assist link 20 along the trajectory G.

To this end, the cam guider 241 has a bolt hole 244 formed in a center thereof, and comes into rolling contact with an outer side of the guide rail 240.

The cam bolt 242 passes through the cam guiders 241, the guide rails 240, and the vehicle body side connection portion 200 of the assist link 20, and then is engaged with a cam nut 245 such that the vehicle body side connection portion 200 of the assist link 20 and the cam guider 241 become a single body and are able to slide upward and downward along the trajectory G of the guide rail 240.

In the above description, the bolt hole 244 is formed in the form of a slot so as to be configured to receive forward and rearward movement of the cam bolt 242.

The drive unit 26 includes an actuator 261 which includes a decelerator 260, a screw shaft 262 which is driven by the actuator 261, and a coupler 263 which connects a rotating shaft of the actuator 261 and the screw shaft 262.

The actuator 261 is configured in a vertical direction so as to be spaced apart from an interior of the housing unit 22, that is, the vehicle body side connection portion 200 of the assist link 20 at a predetermined interval in a vehicle body side direction.

The actuator 261 may be configured as a step motor that is capable of controlling a rotating direction and a rotation speed thereof, but the present invention is not limited thereto, and any driving source may be applied as long as the driving source may accurately control a rotation speed and a rotating direction thereof and may provide rotational torque that is required.

The screw shaft 262 is formed separately from the rotating shaft of the actuator 261, and coupled to upper and lower support members 266 and 267 in a state in which thrust bearings 264 and 265 are interposed to an upper end and a lower end of the screw shaft 262, and is disposed in the housing unit 22 by the upper and lower support members 266 and 267 below the actuator 261 so as to be disposed on the same axis as the rotating shaft of the actuator 261.

The coupler 263 connects the rotating shaft of the actuator 261 and the screw shaft 262 while absorbing a clearance between axes and torsion.

Further, the coupler 263 is seated on a coupler support member 268, and the coupler support member 268 is coupled to the housing unit 22 together with the actuator 261 in a state in which the coupler support member 268 is seated on the housing unit 22.

The power transmission unit 28 includes a slider 280, guide rods 281, and lever arms 282.

The slider 280 has a screw hole 283 formed in a vertical direction so as to be screw-coupled to the screw shaft 262 of the drive unit 26, and is raised and lowered in accordance with a rotating direction of the screw shaft 262.

The guide rod 281 is provided as a pair of guide rods, and the pair of guide rods 281 passes through the slider 280 upward and downward at both sides of the screw shaft 262 such that an upper end and a lower end of the guide rod 281 are fixed to the upper and lower support members 266 and 267, and the guide rod 281 guides the slider 280 to be linearly moved in an up and down direction without moving in a left and right direction.

The lever arm 282 is provided as a pair of lever arms, and the pair of lever arms 282 is disposed at both sides of the vehicle body side connection portion 200 of the assist link 20 such that the wheel side end portion thereof is hingedly fixed to the hinge bracket 220 through a hinge pin 285, and the vehicle body side end portions thereof are connected to both sides of the slider 280.

In addition, the lever arm 282 has a structure in which a connection hole 286 having a slot shape is formed in a central portion of the lever arm 282, and the lever arm 282 is operated together with the cam guiders 241 and the vehicle body side connection portion 200 of the assist link 20 while the cam bolt 242 passes through the connection hole 286.

In the connection structure of the slider 280 and the lever arm 282, fork pins 287 are formed on both side surfaces of the slider 280, and vehicle body side end portions of the lever arms 282 are formed to be forks 288 such that the fork pins 287 and the forks 288 are movable with each other.

Hereby, the power transmission unit 28 may move the vehicle body side connection portion 200 of the assist link 20 upward and downward by the lever arm 282 that forms a fixed hinge point H on the hinge bracket 220 of the housing unit 22.

Of course, the upward and downward movement of the vehicle body side connection portion 200 of the assist link 20 is performed along the movement trajectory of the guide rail 240 and the cam guider 241.

Figure 7:
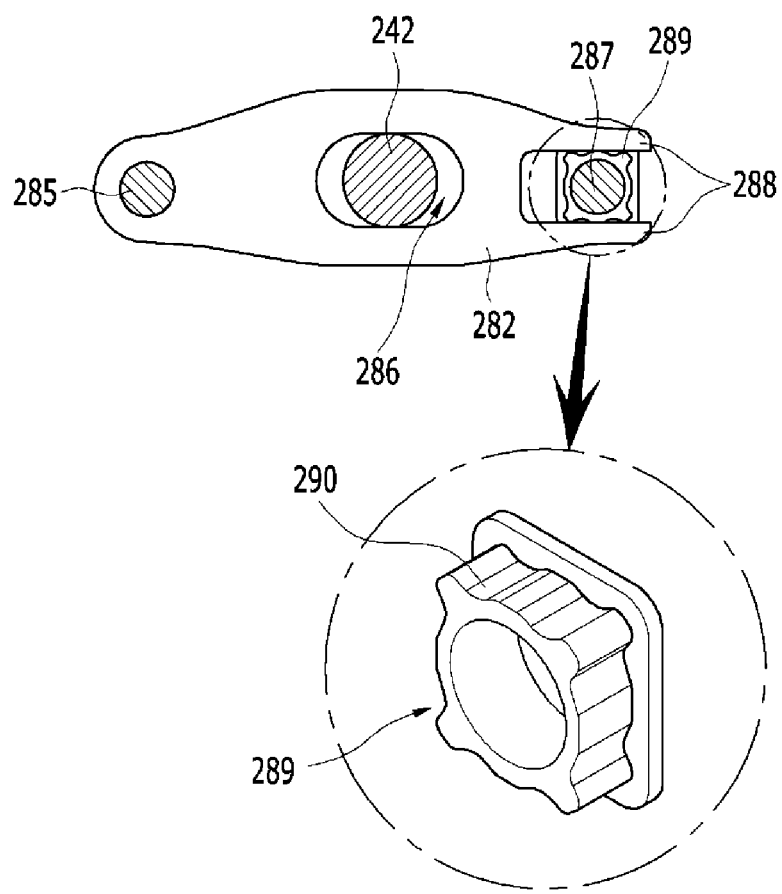
FIG. 7 is a view for explaining a connection structure of a lever arm that is applied to the toe control mechanism of the active geometry control suspension system according to the exemplary embodiment of the present invention.

FIG. 7 is a view for explaining a connection structure of the lever arm that is applied to the toe control mechanism of the active geometry control suspension system according to the exemplary embodiment of the present invention.

Referring to FIG. 7, the connection hole 286 of the lever arm 282 receives a movement of the cam bolt 242 in a horizontal direction by rotation of the lever arm 282.

In addition, the lever arm 282 and the slider 280 are connected through the fork pin 287 and the fork 288, and a bushing 289 is installed on the fork pin 287.

A fork contact portion 290 of the bushing 289 is formed to be a quadrangular shape so as to be able to be assembled regardless of a direction, loads are distributed so that abrasion resistance is improved, and an outer surface of the fork contact portion 290 is formed to have a waveform, thereby minimizing friction by reducing contacting surfaces with the lever arm 282.

Figure 8:
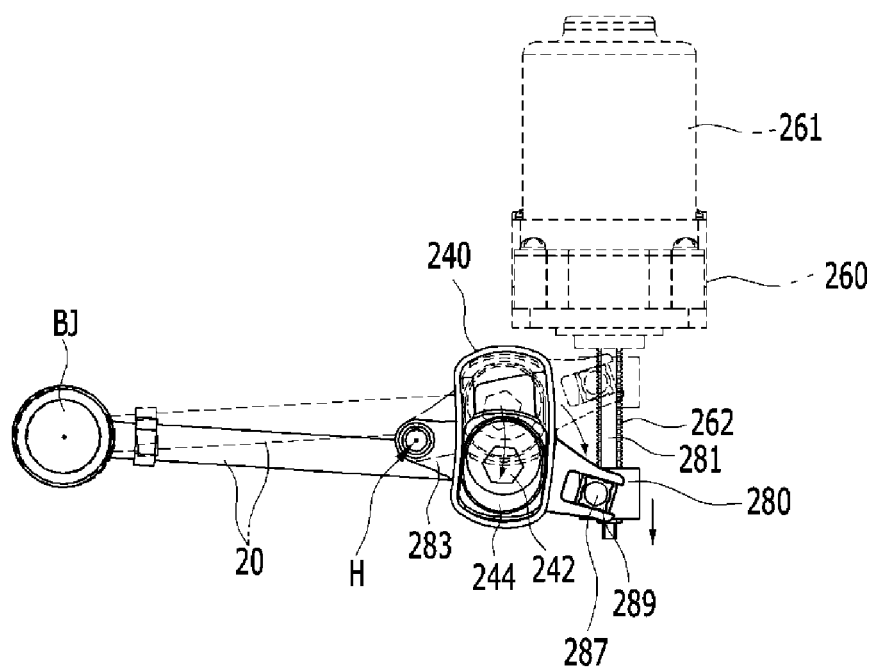
FIG. 8 is an operational state view of the active geometry control suspension system according to the exemplary embodiment of the present invention for each driving condition of a vehicle.

FIG. 8 is an operational state view of the toe control mechanism, which is applied to the active geometry control suspension system according to the exemplary embodiment of the present invention, for each operation condition.

Referring to FIG. 8, in the toe control mechanism 6, when torque of the actuator 261 is transmitted to the screw shaft 262 disposed at the housing unit 22 in a vertical direction, the slider 280 is linearly moved in upward and downward direction according to a rotating direction of the screw shaft 262, and rotates upward and downward the vehicle body side end portion of the lever arm 282 that is hingedly connected to the housing unit 22.

By the rotating operation of the lever arm 282, the cam guiders 241, which are connected by the cam bolt 242, are moved upward and downward along the trajectory G of the guide rail 240, and accordingly, the vehicle body side connection portion 200 of the assist link 20 is moved in upward and downward directions such that a vehicle body side connection point P of the assist link 20 is moved in an upward and downward direction so as to be changed.

To be more specific, when the rear wheel W of the vehicle is bumped due to a high speed turning travel of the vehicle, a controller 30 drives and controls the actuator 261 of a turning outer wheel at the rear wheel W side in accordance with signals of a steering angular velocity, a vehicle speed, and the like.

Accordingly, the slider 280 is lowered along the screw shaft 262, and pushes in the downward direction the vehicle body side end portion of the lever arm 282 of which the wheel side end portion is hingedly connected to the housing unit 22.

Then, the cam guiders 241, which are connected by the cam bolt 242, are lowered along the guide rail 240 while making a predetermined trajectory G such that the vehicle body side connection point P of the assist link 20 is moved downward.

Therefore, a toe-in of the turning outer wheel of the vehicle at the rear wheel W side is increased, and the vehicle is induced to a under steer, thereby securing behavior stability when the vehicle is turned.

Further, after the turning is completed, the vehicle body side connection point P of the assist link 20 is raised and returns back to the original position by an operation opposite to the aforementioned operation.

As describe above, according to the active geometry control suspension system of the exemplary embodiment of the present invention, the vehicle body side connection point of the assist link is moved downward when the vehicle is rapidly turned such that the turning outer side rear wheel is induced to toe-in, thereby increasing turning stability.

Further, the actuator 261 and the screw shaft 262 are separately formed and connected to each other by the coupler 263 such that management of clearance between shafts, and squareness of shafts, development, and tuning are easy, and an assembly and after service may be easy.

In addition, the bushing 289 interposed between the fork pin 287 of the slider 280 and the fork 288 of the lever arm 282 is formed to be quadrangular, such that an assembling may be performed regardless of direction, loads are distributed to improve abrasion resistance, and the fork contact portion 290 of the bushing 289 is formed to have a waveform, thereby minimizing friction between the lever arm 282 and the fork 288.

For convenience in explanation and accurate definition in the appended claims, the terms "upper", "lower", "inner" and "outer", are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. An active geometry control suspension system of a vehicle, comprising:
   a toe control mechanism which is configured between a wheel carrier and a sub-frame at a rear wheel side, and actively controls a posture of a vehicle body,
   wherein the toe control mechanism includes:
   an assist link disposed between the wheel carrier and the sub-frame;
   a housing unit integrally formed with the sub-frame and having hinge brackets integrally formed on both sides of a wheel side one surface;
   a guide unit configured to guide a vehicle body side connection portion of the assist link along a predetermined trajectory through cam guiders which slide upward and downward along guide rails disposed on both side surfaces of the housing unit;
   a drive unit configured to engage an actuator which is installed at one side of the housing unit and a screw shaft disposed at one side of an inner portion of the housing unit by a coupler, and transmit rotating driving torque; and
   a power transmission unit configured to convert the rotating driving torque of the screw shaft into linear motion and transmit the linear motion to the vehicle body side connection portion of the assist link so that the vehicle body side connection portion of the assist link is raised and lowered along the predetermined trajectory of the guide unit by the rotating driving torque of the screw shaft,
   wherein the power transmission unit includes:
   a slider having a screw hole formed in a vertical direction so as to be screw-coupled to the screw shaft of the drive unit;
   a pair of guide rods disposed at left and right sides and configured to pass through the slider upward and downward at both sides of the screw shaft such that an upper end and a lower end of the guide rods are fixed to upper and lower support members, and to guide the slider without moving the slider; and
   a pair of lever arms disposed at left and right sides and disposed at both sides of the vehicle body side connection portion of the assist link such that a wheel side end portion thereof is hingedly connected to the hinge brackets b a hinge pin, and a vehicle body side end portion thereof is connected to both sides of the slider,
   wherein the slider and the lever arms form fork pins on both side surfaces of the slider, and forks on the vehicle body side end portion of the lever arms such that the fork pins and the forks are connected to each other, and bushings are interposed between the fork pins and the forks,
   wherein the bushings have a quadrangular shaped contact portion where the bushings come into contact with the forks, and
   wherein in the contact portion with the forks, an outer surface of the bushings is formed in waveform.

2. The active geometry control suspension system of claim 1, wherein the guide unit includes:
   the guide rails having a guide hole having an arc-shaped trajectory formed in a central portion thereof and fixed on both side surfaces of the housing unit;
   the cam guider having a slot-shaped bolt hole formed in a central portion thereof and configured to come into rolling contact with each of the guide rails so as to be raised and lowered along each of the guide rails; and
   a cam bolt engaged with a cam nut by passing through the bolt hole of the cam guider, the guide hole of the guide rails, and the vehicle body side connection portion of the assist link, and configured to allow the vehicle body side connection portion of the assist link and the cam guider to integrally slide upward and downward along the trajectory of the guide hole.

3. The active geometry control suspension system of claim 2, wherein the trajectory of the guide hole is formed of an arc-shaped trajectory that has a wheel side connection point of the assist link as a rotation center thereof.

4. The active geometry control suspension system of claim 1, wherein the drive unit includes:
   the actuator installed at one side of an upper portion of the housing unit and including a decelerator;
   the screw shaft configured to be separated from the rotating shaft of the actuator and disposed at one side of an inner portion of the housing unit; and
   the coupler configured to connect the rotating shaft of the actuator and the screw shaft.

5. The active geometry control suspension system of claim 4, wherein the actuator includes a step motor that is capable of controlling a rotating direction and a rotation speed thereof.

6. The active geometry control suspension system of claim 4, wherein the screw shaft is installed on the upper and lower support members by interposing thrust bearings to an upper end and a lower end of the screw shaft, respectively, and disposed in the housing unit by the upper and lower support members so as to be disposed on the same axis as the rotating shaft of the actuator.

7. The active geometry control suspension system of claim 1, wherein the coupler connects the rotating shaft of the actuator and the screw shaft so that power is transmitted therethrough, in a state in which the coupler is seated on a coupler support member that is installed at one side of an upper portion of the housing unit.

* * * * *